United States Patent
Hernandez

(10) Patent No.: US 12,063,984 B2
(45) Date of Patent: Aug. 20, 2024

(54) KNITTED QUILT FABRIC AND COMPRESSION GARMENTS MADE THEREFROM

(71) Applicant: Pure Medical, Inc., Wauwatosa, WI (US)

(72) Inventor: Israel Hernandez, Milwaukee, WI (US)

(73) Assignee: PURE MEDICAL, INC., Wauwatosa, WI (US)

(*) Notice: Subject to any disclaimer, the term of this patent is extended or adjusted under 35 U.S.C. 154(b) by 456 days.

(21) Appl. No.: 17/102,005

(22) Filed: Nov. 23, 2020

(65) Prior Publication Data

US 2021/0177071 A1 Jun. 17, 2021

Related U.S. Application Data

(60) Provisional application No. 62/948,649, filed on Dec. 16, 2019.

(51) Int. Cl.
*D04B 1/22* (2006.01)
*A41B 11/08* (2006.01)
(Continued)

(52) U.S. Cl.
CPC .............. *A41B 11/08* (2013.01); *D04B 1/123* (2013.01); *D04B 1/22* (2013.01); *D04B 1/26* (2013.01);
(Continued)

(58) Field of Classification Search
None
See application file for complete search history.

(56) References Cited

U.S. PATENT DOCUMENTS 3,023,192 A * 2/1962 Shivers, Jr. .......... C08G 63/672
528/193
3,290,694 A * 12/1966 Goodman ................ A41D 1/04
2/90
(Continued)

FOREIGN PATENT DOCUMENTS

EP 1679395 A1 7/2006
EP 3123989 A1 * 2/2017 ........... A61F 13/061
(Continued)

OTHER PUBLICATIONS

Hodakel, Boris. "What Is Elastane Fabric: Properties, How Its Made and Where." Sewport, Sewport, Aug. 20, 2020, https://sewport.com/fabrics-directory/elastane-fabric#:~:text=This%20textile%20is%20composed%20of,not%20exist%20anywhere%20in%20nature. (Year: 2020).*

(Continued)

*Primary Examiner* — Grace Huang
(74) *Attorney, Agent, or Firm* — Husch Blackwell LLP

(57) ABSTRACT

A knitted quilt fabric is made of a first layer of a first knit material and a second layer of a second knit material, with a filler material composed of a plurality of plaited lay-in fibers between the two layers. The first layer and second layer are joined at a plurality of locations with knits forming at least one linear quilt line. Each knit of the linear quilt line is formed around a plaited lay-in fiber by knitting a first fiber of the first material to the second material and returning to the first material and knitting a second fiber of the second material to the first material and returning to the second material. Each lay-in fiber is an elastic polyether-polyurea copolymer which is plaited with one or more natural or synthetic yarns.

20 Claims, 5 Drawing Sheets

(51) Int. Cl.
*D04B 1/12* (2006.01)
*D04B 1/26* (2006.01)

(52) U.S. Cl.
CPC ....... *A41B 2400/32* (2013.01); *A41B 2500/10* (2013.01); *B32B 2437/00* (2013.01); *D10B 2501/021* (2013.01)

(56) References Cited

U.S. PATENT DOCUMENTS

| | | | | |
|---|---|---|---|---|
| 4,601,940 | A * | 7/1986 | Fischer | A41C 3/0014 264/258 |
| 4,961,418 | A * | 10/1990 | McLaurin-Smith | A61F 13/10 602/61 |
| 5,538,502 | A * | 7/1996 | Johnstone | A41C 3/02 602/61 |
| 5,735,145 | A * | 4/1998 | Pernick | A61F 13/53 66/196 |
| 5,749,212 | A * | 5/1998 | Rees | D02G 3/324 57/224 |
| 5,809,861 | A * | 9/1998 | Hummel | D04C 1/12 87/8 |
| 6,253,582 | B1 * | 7/2001 | Driggars | D04B 1/14 66/202 |
| 6,931,762 | B1 * | 8/2005 | Dua | A43B 23/042 66/185 |
| 8,904,593 | B2 * | 12/2014 | Hollows | A63B 47/04 15/210.1 |
| 9,551,095 | B2 * | 1/2017 | Lee | D04B 15/367 |
| 9,683,320 | B2 * | 6/2017 | Lee | D02G 3/02 |
| 10,351,979 | B2 * | 7/2019 | Dua | D04B 15/56 |
| 10,415,164 | B2 * | 9/2019 | Diaz | D04B 1/108 |
| 10,736,568 | B2 * | 8/2020 | Moltani | A61B 5/282 |
| 11,408,102 | B2 * | 8/2022 | Poulsen | A43B 23/0295 |
| 11,408,104 | B2 * | 8/2022 | Dardinski | D04B 9/46 |
| 11,441,247 | B2 * | 9/2022 | Kunzmann | D04B 1/102 |
| 11,492,736 | B2 * | 11/2022 | Dorjgurkhem | D04B 1/123 |
| 11,497,875 | B2 * | 11/2022 | Guney | A61M 16/0622 |
| 11,583,228 | B2 * | 2/2023 | Jur | A61B 5/6843 |
| 11,608,575 | B2 * | 3/2023 | Pogl | A43C 5/00 |
| 2010/0184355 | A1 * | 7/2010 | Kennedy | A41C 1/06 66/171 |
| 2011/0143083 | A1 * | 6/2011 | Scorgie | B32B 27/40 428/221 |
| 2013/0180028 | A1 * | 7/2013 | Kishihara | A41D 19/0065 2/167 |
| 2015/0104604 | A1 * | 4/2015 | Rock | B32B 5/26 5/413 R |
| 2017/0172238 | A1 * | 6/2017 | Driver | A41D 3/00 |
| 2017/0211214 | A1 * | 7/2017 | Kuo | D04B 1/123 |
| 2020/0131675 | A1 * | 4/2020 | Bhatnagar | D02G 3/442 |
| 2022/0178053 | A1 * | 6/2022 | Wang | D03D 15/292 |

FOREIGN PATENT DOCUMENTS

| | | | |
|---|---|---|---|
| EP | 3123989 A1 | 2/2017 | |
| FR | 3092341 A1 * | 8/2020 | ............... D02G 3/32 |
| GB | 1148086 A | 4/1969 | |
| WO | 2017112926 A1 | 6/2017 | |

OTHER PUBLICATIONS

International Search Report and Written Opinion for International Application No. PCT/US2020/061797 dated Mar. 5, 2021, 15 pages.
International Preliminary Report on Patentability issued May 17, 2022 in international patent application No. PCT/US2020/061797.

* cited by examiner

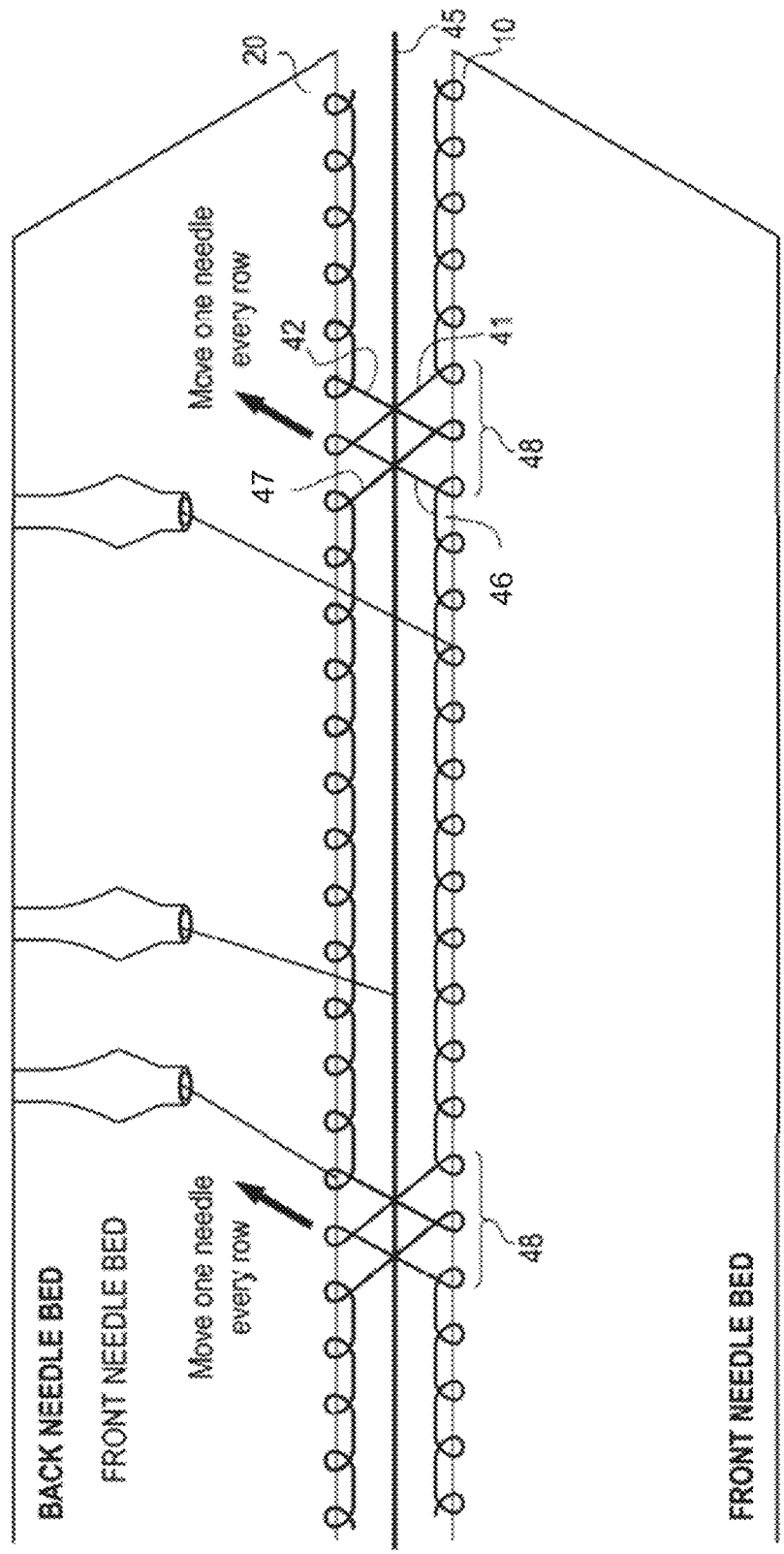

KNITTED QUILT FABRIC AND COMPRESSION GARMENTS MADE THEREFROM

FIELD

The disclosure relates, generally, to the field of knitted quilt fabrics. More particularly, the disclosure relates to a fully fashioned knitted quilt fabric and compression garments for patients affected with lymphedema.

BACKGROUND

Quilted fabrics are generally manufactured by taking two fabric layers, such as knitted fabric layers, and inserting a filler material or pad (e.g., foam, polyester, etc.) between the two layers. The two fabric layers may be stitched together over the filler thereby creating quilt lines which serve to stabilize the filler material between the two fabric layers and also add a decorative aesthetic quality to the quilted article.

Such traditional methods of manufacturing take time. The two fabric layers must be manufactured before quilting. Moreover, the quilt lines in such constructions can weaken over time, resulting in the two fabric layers disengaging one another.

Moreover, when forming a compression garment from such a quilted fabric, the flat quilted fabric must be cut and sewn into a tubular shape to fit a specified limb. The "cut and sew" method of manufacture is time-consuming and prone to error with respect to sizing/fit defects as well as manufacturing defects.

Therefore, a need exists to overcome the above stated, and other, deficiencies of existing knitted quilt fabrics and compression garments made therefrom.

SUMMARY OF THE DISCLOSURE

To overcome the aforementioned, and other, deficiencies, the present disclosure provides a knitted quilt fabric.

In accordance with some embodiments of the present disclosure, a knitted quilt fabric comprises a first layer of a first knit material; a second layer of a second knit material; and a filler material between the first layer and second layer comprising a plurality of lay-in fibers plaited with one or more natural or synthetic yarns, the plurality of lay-in fibers each comprising an elastic polyether-polyurea copolymer yarn; wherein the first layer and second layer are joined in a plurality of locations forming at least one quilt line, wherein the at least one quilt line is formed from a plurality of knits made by knitting a first fiber of the first material to the second material and returning to the first material and knitting a second fiber of the second material to the first material and returning to the second material, and wherein at least one of the plurality of lay-in fibers is inside each of the plurality of knits.

In accordance with some embodiments of the present disclosure, a compression garment is provided. A compression garment comprises a tubular body having an axis, wherein the tubular body is made of a knitted quilt fabric having an outer layer of a first knit material, an inner layer of a second knit material, and a filler material between the outer layer and inner layer comprising a plurality of lay-in fibers, the plurality of lay-in fibers each comprising an elastic polyether-polyurea copolymer yarn, wherein the outer layer and inner layer are joined in a plurality of locations using knits which form at least one quilt line in a spiral fashion around the axis, wherein the at least one quilt line is formed by knitting a first fiber of the first material to the second material and returning to the first material and knitting a second fiber of the second material to the first material and returning to the second material, and wherein the quilt line is formed around at least one of the plurality of lay-in fibers.

The foregoing and other features and advantages of the disclosure will be apparent from the following more particular description of embodiments of the disclosure. It is to be understood that both the foregoing general description and the following detailed description are exemplary, but are not restrictive, of the disclosure.

BRIEF DESCRIPTION OF THE DRAWINGS

The features of the present disclosure will best be understood from a detailed description of the disclosure and an embodiment thereof selected for the purposes of illustration and shown in the accompanying drawings in which:

FIG. 3 is an enlarged cross-sectional schematic along line 3-3 of FIG. 1 showing a seam for a knitted quilt fabric, in accordance with embodiments of the present disclosure;

DETAILED DESCRIPTION OF THE PREFERRED EMBODIMENT

Figure 1:
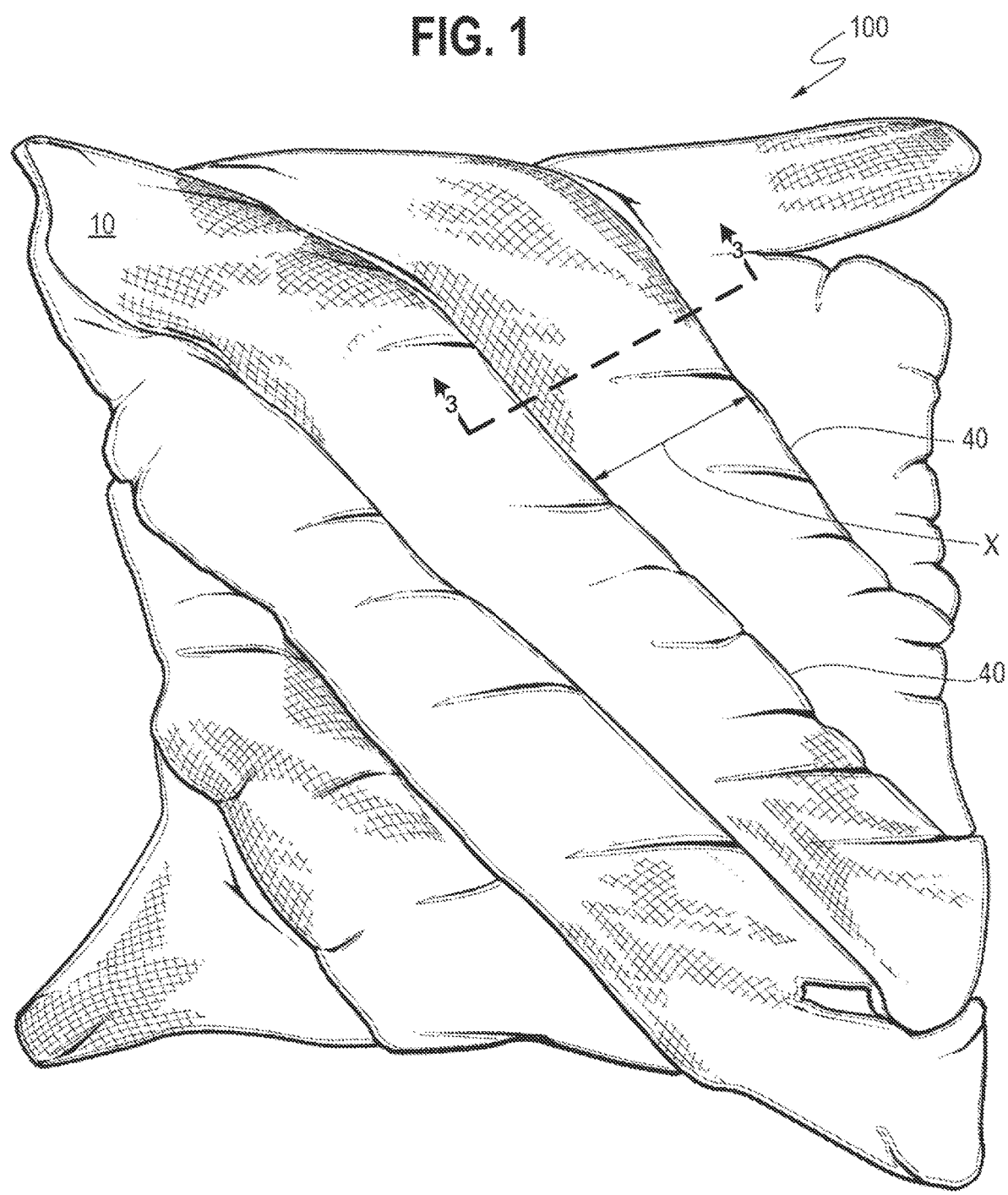
FIG. 1 is a perspective view of a knitted quilt fabric, in accordance with embodiments of the present disclosure.

Although certain preferred embodiments of the present disclosure will be shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of an embodiment. The features and advantages of the present disclosure are illustrated in detail in the accompanying drawings, wherein like reference numerals refer to like elements throughout the drawings.

Definitions

As a preface to the detailed description, it should be noted that, as used in this specification and the appended claims, the singular forms "a", "an" and "the" include plural referents, unless the context clearly dictates otherwise.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all materials claimed through use of the term "comprising" may include any additional additive, adjuvant, or compound, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination.

"Strand" and like terms refer to an elongated column of entangled fibers and/or filaments.

"Fiber," "filament," and like terms refer to a single, continuous elongated material having generally round cross-section and a length to diameter ratio of greater than 10. Fiber diameter can be measured and reported in a variety of fashions. Generally, fiber diameter is measured in denier, which is a textile term defined as the grams of the fiber per 9,000 meters of that fiber's length. Monofilament generally refers to a singular extruded filament having a denier per filament greater than 15, usually greater than 30. Fine denier fiber generally refers to fiber having a denier of 15 or less. Microdenier (aka microfiber) generally refers to fiber having a diameter of from greater than 0 micrometers to less than 10 micrometers.

"Yarn" refers to at least one strand. A "knit material" is formed from intertwining yarns and/or strands in a series of connected loops either by hand, with knitting needles, or on a machine. The knit material may be formed by warp or weft knitting, flat knitting, and circular knitting. Nonlimiting examples of suitable warp knits include tricot, raschel powernet, and lacing. Nonlimiting examples of suitable weft knits include circular, flat, and seamless (which is often considered a subset of circular knits). Nonlimiting examples of suitable knit materials include jersey knit material and rib knit material.

A "lay-in element" comprises an elastic yarn. A nonlimiting example of the elastic yarn is an elastic polyether-polyurea copolymer (e.g., elastane or lycra) yarn. The elastic yarn may or may not be covered, accompanied, or surrounded by one or more filaments/fibers or yarns that may be synthetic or natural. As such, in one embodiment, the lay-in element consists of, or consists essentially of, the elastic yarn. In another embodiment, the lay-in element includes one or more additional fibers/filaments or yarns covering, accompanying, or surrounding the elastic yarn. In an embodiment, the one or more additional fibers/filaments or yarns are twisted around the elastic yarn (e.g., in an S-twist or a Z-twist) to form a cover around the elastic yarn. The one or more additional fibers/filaments or yarns may be synthetic or natural.

The term "parallel," as used herein, means extending in the same direction and never intersecting.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species.

"Yarn" is a continuous length of twisted or otherwise entangled filaments that can be used in the manufacture of knit materials.

Knitted Quilt Fabric

In accordance with some embodiments of the present disclosure, a knitted quilt fabric comprises a first layer of a first knit material; a second layer of a second knit material; and a filler material between the first layer and second layer comprising a plurality of lay-in elements each comprising a core which is an elastic polyether-polyurea copolymer which is plaited with one or more natural or synthetic fibers; wherein the first layer and second layer are joined in a plurality of locations forming at least one quilt line, wherein the at least one quilt line is formed from a plurality of knits made by knitting a first fiber of the first material to the second material and returning to the first material and knitting a second fiber of the second material to the first material and returning to the second material, and wherein at least one of the plurality of lay-in elements is inside each of the plurality of knits.

Figure 2:
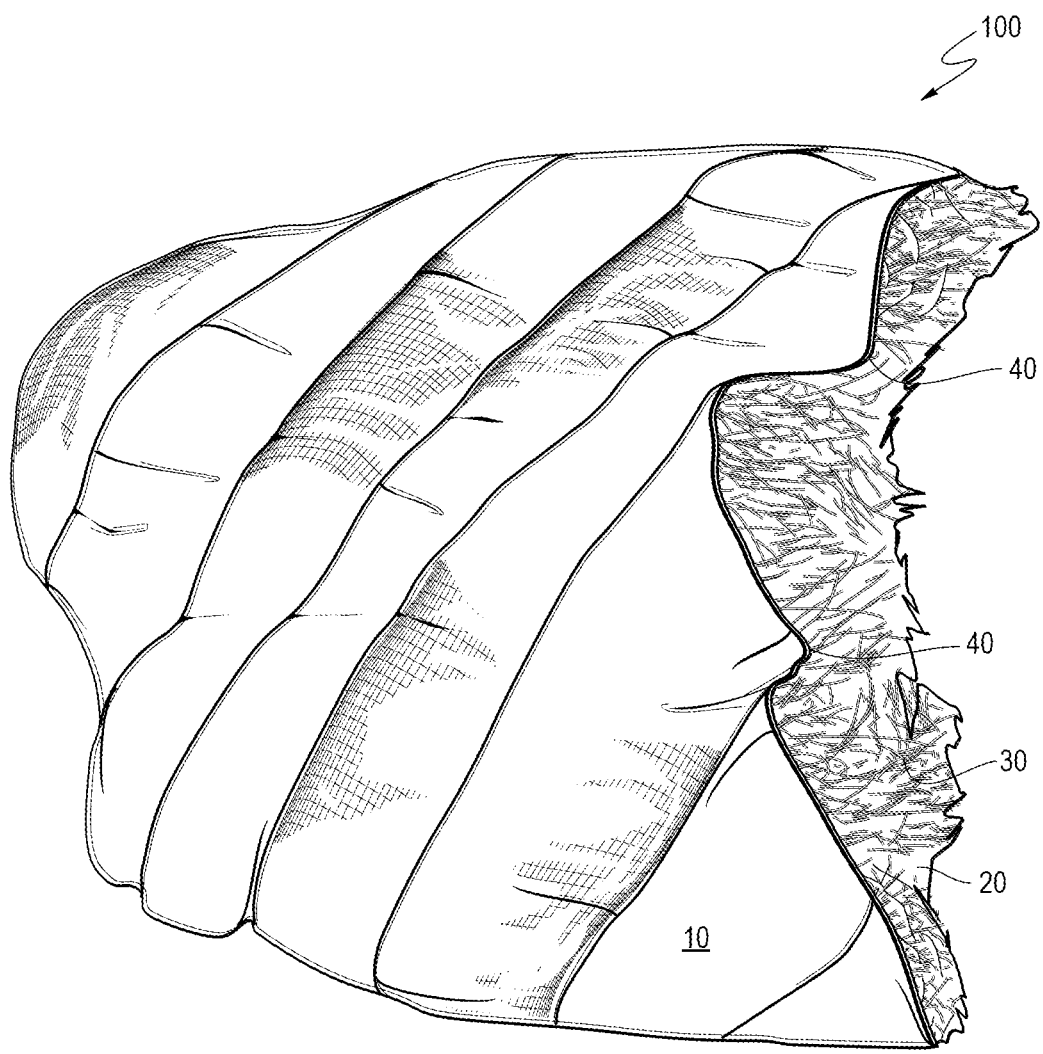
FIG. 2 is a cross-sectional view of the knitted quilt fabric of FIG. 1.

FIG. 1 illustrates an exemplary knitted quilt fabric 100 in accordance with embodiments of the present disclosure, and FIG. 2 provides a cross-sectional view of the fabric 100. As shown in FIGS. 1 and 2, the knitted quilt fabric 100 includes a first layer 10 composed of a first material and a second layer 20 composed of a second material. The first and second material may be the same or different and are both a knit material, such as a jersey knit material and/or a rib knit material. In an embodiment, the first and second material are the same or different and are both a jersey knit material. In another embodiment, the first and second material are the same or different and are both a rib knit material. In an embodiment, the first knit material and second knit material are made of a polyester, polyamide, polypropylene, polyethylene, polyether-polyurea copolymer, silk, cotton, rayon, and combinations of these materials. In a further embodiment, the first and second material are selected from nylon, silk, cotton, rayon and combinations thereof.

Between the first layer 10 and second layer 20 is a filler layer 30. In an embodiment, the filler layer 30 is composed of a filler material that is composed of a plurality of lay-in elements 45. In an embodiment, the lay-in elements 45 are plaited together. In another embodiment, the lay-in elements 45 are plaited with and/or accompanied by a second fiber, such as a microfiber.

In an embodiment, the filler layer 30 is composed of a filler material that contains, consists essentially of, or consists of a plurality of lay-in elements 45, the plurality of lay-in elements 45 consisting essentially of, or consisting of, an elastic fiber such as an elastic polyether-polyurea copolymer (e.g., elastane or lycra) fiber. The elastic fiber is not covered, accompanied, or surrounded by additional fiber.

In an embodiment, the filler layer 30 is composed of a filler material that includes a plurality of lay-in elements 45, each of the lay-in elements 45 including an elastic fiber, such as an elastic polyether-polyurea copolymer (e.g., elastane or lycra) fiber, that is covered, accompanied, or surrounded by one or more additional fibers. The fibers of the lay-in element 45 may be synthetic or natural. In an embodiment, the additional fibers are twisted around the elastic fiber (e.g., in an S-twist or a Z-twist) to form a cover around the elastic fiber.

In an embodiment, the one or more synthetic or natural yarns is a natural yarn made of cotton, wool, bamboo, cashmere, alpaca, mohair, or other animal fur or plant-based fiber and combinations thereof. In an embodiment, the one or more synthetic or natural yarns is a synthetic yarn made of polyester, polyamide, polypropylene, polyethylene, polyether-polyurea copolymer, rayon and combinations of these materials. In a particular embodiment, the one or more synthetic or natural yarns is a synthetic microfiber yarn (i.e., a fiber yarn wherein the individual fibers have a diameter of greater than 0 and less than 10 micrometers). The synthetic microfiber yarn may be polyester, polyamide, polypropylene or a combination of these materials.

In an embodiment, the filler layer 30 is composed of a filler material containing the plurality of lay-in elements 45 and one or more fibers. The lay-in elements 45 may be plaited, accompanied or surrounded by the one or more fibers. In an embodiment, the lay-in element 45 is plaited, accompanied or surrounded by a blend of one or more synthetic microfibers and one or more natural or synthetic fibers which are not microfibers, including, but not limited to, non-microfibers made of cotton, wool, bamboo, cashmere, alpaca, mohair, or other animal fur or plant-based fiber, polyester, polyamide, polypropylene, polyethylene, polyether-polyurea copolymer, rayon and combinations of these materials.

It is the cushioning effect of the fibers provided with the lay-in element 45 which result in the quilted quality of the fabric 100. Particularly, in the embodiment in which at least one microfiber is provided with the lay-in element 45 (as a cover in the lay-in element 45 and/or as a separate fiber plaited with, accompanying, or surrounding the lay-in element 45), the expansion of the microfibers between the first layer 10 and second layer 20 contribute to the quilted quality of the fabric 100.

As shown in FIG. 1, the first layer 10 and second layer 20 are joined in a plurality of locations forming at least one quilt line 40 or, in the specific embodiment shown, five quilt lines 40. A "quilt line" is a line of a plurality of seam knits arranged end-to-end. As shown in FIG. 3, a "seam knit" 48 is a plurality of overlapping stitches that includes, at a minimum, (a) a first stitch 46 formed from a fiber 41 of the first layer 10 that extends (i) from the first layer 10, (ii) through the filler layer 30 at a first position, (iii) into the second layer 20 such that the fiber 41 is knitted to the second layer 20, (iv) through the filler layer 30 at a second position, and (v) back into the first layer 10; and (b) a second stitch 47 formed from a fiber 42 of the second layer 20 that extends (i) from the second layer 20, (ii) through the filler layer 30 at a third position, (iii) into the first layer 10 such that the fiber 42 is knitted to the first layer 10, (iv) through the filler layer 30 at a fourth position, and (v) back into the second layer 20. Thus, the first layer 10 and second layer 20 are joined in a plurality of locations to form at least one quilt line 40. The first position may be the same or different than the third position. The second position may be the same or different than the fourth position. In an embodiment, a lay-in element 45 runs through each stitch 46, 47 of the quilt line 40.

FIG. 3 is a schematic showing two quilt lines 40 in further detail. As shown, each quilt line 40 is made by knitting a fiber 41 of the first layer 10 to the second layer 20 and then returning the fiber 41 to knit on the first layer 10. Similarly, a fiber 42 of the second layer 20 is at the same location knitted to the first layer 10 and then returned and knitted to the second layer 20. The result is a quilt line 40 formed by a plurality of these seam knits.

In the embodiment shown in FIG. 1, the quilt lines 40 are running diagonal and parallel to one another on an approximately rectangular piece of knitted quilt fabric 100. In other embodiments, the quilt lines 40 may run straight, parallel or intersecting, or even perpendicular to one another or in some other pattern/design. In still further embodiments, the knitted quilt fabric 100 itself may have a shape other than rectangular (e.g., triangular, polygonal) or an irregular shape.

In an embodiment, the quilt lines 40 are separated from each other by a distance, X, of from 1 centimeter (cm), or 2 cm, or 3 cm, or 4 cm to 5 cm, or 6 cm, or 8 cm, or 10 cm, or 15 cm, or 20 cm. In another embodiment, the quilt lines 40 are separated from each other by a distance, X, of from 1 cm to 20 cm, or from 1 cm to 10 cm, or from 1 cm to 8 cm, or from 1 cm to 5 cm, or from 2 cm to 5 cm, or from 3 cm to 5 cm, or from 4 cm to 5 cm, or from 5 cm to 20 cm, or from 1 cm to 4 cm.

As shown in FIG. 3, the quilt lines 40 are each formed around the lay-in element 45. The fiber 41 of the first layer 10 is knit to the second layer 20 on a first side of a lay-in element 45 and then returned to the first layer 10 on the opposite side. Similarly, a fiber 42 of the second layer 20 is at the same location knitted to the first layer 10 on the side of the lay-in element 45 opposite the fiber 41 of the first layer 10 and then returned and knitted to the second layer 20 on the opposite side. The result is a quilt line 40 formed by a plurality of these seam knits 48 with a lay-in element 45 running through each stitch 46, 47 of the quilt line 40.

Each stitch 46, 47 of a quilt line 40 will have a lay-in element 45 running through the middle of the stitch 46, 47. Likewise, each lay-in element 45 will, at some point along its length, be part of a stitch 46, 47 of a quilt line 40. The lay-in elements 45 are therefore not parallel with the quilt lines 40. Rather, the lay-in elements 45 run at an orientation of from 50°, or 60°, or 70°, or 80°, or 90° to 100°, or 110°, or 120°, or 130°, or 140°, or 150° relative to the quilt line 40. In a particular embodiment, the lay-in elements 45 are at an orientation of from 70°, or 80°, or 90° to 100°, or 110°, or 120° relative to the quilt line 40. In another embodiment, the lay-in elements 45 are at an orientation of from 50° to 150°, or from 70° to 120°, or from 80° to 110°, or from 90° to 100°, or 90° relative to the quilt line 40. In further embodiments, the lay-in elements 45 are parallel with one pair of opposed edges of an overall generally rectangular knitted quilt fabric 100.

In a particular embodiment, the lay-in elements 45 are not parallel with the quilt lines 40 and are also not perpendicular to the quilt lines 40. In other words, in a particular embodiment, the lay-in elements 45 run at an orientation of from 50°, or 60°, or 70°, or 80°, or less than 90° to greater than 90°, or 100°, or 110°, or 120°, or 130°, or 140°, or 150° relative to the quilt line 40. In a particular embodiment, the lay-in elements 45 are at an orientation of from 70°, or 80°, or less than 90° to greater than 90°, or 100°, or 110°, or 120° relative to the quilt line 40. In a specific embodiment, the lay-in elements 45 are at an orientation of from 70°, or 80°, or less than 90° to greater than 90°, or 100°, or 110°, or 120° relative to the quilt line 40 and generally parallel with one pair of opposed edges of an overall generally rectangular knitted quilt fabric. 100. In another embodiment, the lay-in elements 45 are at an orientation of from 50° to less than 90°, or from 70° to less than 90°, or from greater than 90° to 150°, or from greater than 90° to 120° relative to the quilt line 40.

In an embodiment, one or both layers 10, 20 may be treated with one or more surface treatments such as an antimicrobial composition, antibacterial composition, odor eliminating composition, and so forth. In still further embodiments, additional layers may be included between or outward from the first and second layers 10, 20, including, but not limited to, moisture-wicking material layers, supportive layers, and combinations of these and other layers.

In an embodiment, the first layer 10 and the filler layer 30 are in direct contact with each other. In another embodiment, the second layer 20 and the filler layer 30 are in direct contact with each other. The term "directly contacts," as used herein, is a layer configuration whereby the first layer 10 and/or the second layer 20 is located immediately adjacent to the filler layer 30, and no intervening layers, or no intervening structures, are present between the first layer 10 and/or the second layer 20 and the filler layer 30. The filler layer 30 directly contacts a surface of the first layer 10 and/or the second layer 20. In an embodiment, the filler layer 30 directly contacts a surface of the first layer 10 and/or the second layer 20.

In an embodiment, the first layer 10 and the filler layer 30 are in indirect contact with each other. In another embodiment, the second layer 20 and the filler layer 30 are in indirect contact with each other. The term "indirectly contacts," as used herein, is a layer configuration whereby the first layer 10 and/or the second layer 20 is located adjacent to the filler layer 30, with intervening layers, or intervening structures, present between the first layer 10 and/or the second layer 20 and the filler layer 30.

In an embodiment, the knitted quilt fabric 100 includes, consists essentially of, or consists of:
(i) a first layer 10 containing, consisting essentially of, or consisting of a first knit material;
(ii) a second layer 20 containing, consisting essentially of, or consisting of a second knit material;
(iii) a filler layer 30 containing, consisting essentially of, or consisting of a filler material, the filler layer 30 positioned between the first layer 10 and the second layer 20, the filler material containing, consisting essentially of, or consisting of a plurality of lay-in elements 45 plaited with one or more natural or synthetic fibers, the plurality of lay-in elements 45 each comprising an elastic polyether-polyurea copolymer fiber;
wherein the first layer 10 and second layer 20 are joined in a plurality of locations forming at least one quilt line 40,
wherein the at least one quilt line 40 is formed from a plurality of seam knits 48 made by knitting a first fiber 41 of the first material to the second material and returning to the first material and knitting a second fiber 42 of the second material to the first material and returning to the second material,
wherein at least one of the plurality of lay-in elements 45 is inside each of the plurality of seam knits 48; and
the knitted quilt fabric has one, some, or all of the following properties:
(a) the first knit material and/or the second knit material is a jersey knit material and/or a rib knit material; and/or
(b) the first knit material and/or the second knit material are made of a polyester, polyamide, polypropylene, polyethylene, polyether-polyurea copolymer, silk, cotton, rayon, and combinations of thereof; and/or
(c) the first knit material and/or the second knit material is selected from nylon, silk, cotton, rayon, and combinations thereof; and/or (d) the filler material comprises a plurality of microfibers; and/or
(e) the one or more synthetic or natural fibers is a natural fiber made of cotton, wool, bamboo, cashmere, alpaca, mohair, or other animal fur or plant-based fiber and combinations thereof; and/or
(f) the one or more synthetic or natural fibers is a synthetic fiber made of polyester, polyamide, polypropylene, polyethylene, polyether-polyurea copolymer, rayon and combinations thereof; and/or
(g) the knitted quilt fabric 100 comprises at least two quilt lines 40, or at least three quilt lines 40, or at least four quilt lines 40, or at least five quilt lines 40, or at least six quilt lines 40, or at least seven quilt lines 40, or at least eight quilt lines 40; and/or
(h) the quilt lines 40 are separated from each other by a distance, X, of from 1 cm to 20 cm, or from 1 cm to 10 cm, or from 1 cm to 8 cm, or from 1 cm to 5 cm, or from 2 cm to 5 cm, or from 3 cm to 5 cm, or from 4 cm to 5 cm, or from 5 cm to 20 cm, or from 1 cm to 4 cm; and/or
(i) the lay-in elements 45 are at an orientation of from 50° to 150°, or from 70° to 120°, or from 80° to 110°, or from 90° to 100°, or from 50° to less than 90°, or from 70° to less than 90°, or from greater than 90° to 150°, or from greater than 90° to 120°, or 90° relative to the quilt line 40; and/or
(j) each of the plurality of lay-in elements 45 is not perpendicular to the at least one quilt line 40; and/or
(k) the first layer 10 and/or the second layer 20 is treated with one or more surface treatments, such as an antimicrobial composition, antibacterial composition, odor eliminating composition, and combinations thereof; and/or
(l) knitted quilt fabric 100 is in the form of a compression garment.

In an embodiment, the knitted quilt fabric 100 includes, consists essentially of, or consists of:
(i) a first layer 10 containing, consisting essentially of, or consisting of a first knit material;
(ii) a second layer 20 containing, consisting essentially of, or consisting of a second knit material;
(iii) a filler layer 30 containing, consisting essentially of, or consisting of a filler material, the filler layer 30 positioned between the first layer 10 and the second layer 20, the filler material containing, consisting essentially of, or consisting of a plurality of lay-in elements 45 plaited with one or more natural or synthetic fibers, the plurality of lay-in elements 45 each comprising an elastic polyether-polyurea copolymer fiber;
wherein the first layer 10 and second layer 20 are joined in a plurality of locations forming at least one quilt line 40,
wherein the at least one quilt line 40 includes a plurality of seam knits arranged end-to-end, and each seam knit includes a plurality of overlapping stitches that includes
(a) a first stitch 46 formed from a fiber 41 of the first layer 10 that extends (i) from the first layer 10, (ii) through the filler layer 30 at a first position, (iii) into the second layer 20 such that the fiber 41 is knitted to the second layer 20, (iv) through the filler layer 30 at a second position, and (v) back into the first layer 10; and
(b) a second stitch 47 formed from a fiber 42 of the second layer 20 that extends (i) from the second layer 20, (ii) through the filler layer 30 at a third position, (iii) into the first layer 10 such that the fiber 42 is knitted to the first layer 10, (iv) through the filler layer 30 at a fourth position, and (v) back into the second layer 20;

wherein at least one of the plurality of lay-in elements 45 is inside each of the plurality of seam knits 48; and the knitted quilt fabric has one, some, or all of the following properties:

(a) the first knit material and/or the second knit material is a jersey knit material and/or a rib knit material; and/or (b) the first knit material and/or the second knit material are made of a polyester, polyamide, polypropylene, polyethylene, polyether-polyurea copolymer, silk, cotton, rayon, and combinations of thereof; and/or (c) the first knit material and/or the second knit material is selected from nylon, silk, cotton, rayon, and combinations thereof; and/or (d) the filler material comprises a plurality of microfibers; and/or (e) the one or more synthetic or natural fibers is a natural fiber made of cotton, wool, bamboo, cashmere, alpaca, mohair, or other animal fur or plant-based fiber and combinations thereof; and/or (f) the one or more synthetic or natural fibers is a synthetic fiber made of polyester, polyamide, polypropylene, polyethylene, polyether-polyurea copolymer, rayon and combinations thereof, and/or (g) the knitted quilt fabric 100 comprises at least two quilt lines 40, or at least three quilt lines 40, or at least four quilt lines 40, or at least five quilt lines 40, or at least six quilt lines 40, or at least seven quilt lines 40, or at least eight quilt lines 40; and/or (h) the quilt lines 40 are separated from each other by a distance, X, of from 1 cm to 20 cm, or from 1 cm to 10 cm, or from 1 cm to 8 cm, or from 1 cm to 5 cm, or from 2 cm to 5 cm, or from 3 cm to 5 cm, or from 4 cm to 5 cm, or from 5 cm to 20 cm, or from 1 cm to 4 cm; and/or (i) the lay-in elements 45 are at an orientation of from 50° to 150°, or from 70° to 120°, or from 80° to 110°, or from 90° to 100°, or from 50° to less than 90°, or from 70° to less than 90°, or from greater than 90° to 150°, or from greater than 90° to 120°, or 90° relative to the quilt line 40; and/or (j) each of the plurality of lay-in elements fibers 45 is not perpendicular to the at least one quilt line 40; and/or (k) the first layer 10 and/or the second layer 20 is treated with one or more surface treatments, such as an antimicrobial composition, antibacterial composition, odor eliminating composition, and combinations thereof; and/or (l) the first position is the same or different than the third position; and/or (m) the second position is the same or different than the fourth position; and/or (n) knitted quilt fabric 100 is in the form of a compression garment.

Compression Garment

In accordance with some embodiments of the present disclosure, a compression garment is provided. A compression garment comprises a tubular body having an axis, wherein the tubular body is made of a knitted quilt fabric having an outer layer of a first knit material, an inner layer of a second knit material, and a filler material between the outer layer and inner layer comprising a plurality of lay-in elements, the plurality of lay-in elements each comprising an elastic polyether-polyurea copolymer fiber, wherein the outer layer and inner layer are joined in a plurality of locations using knits which form at least one quilt line in a spiral fashion around the axis, wherein the at least one quilt line is formed by knitting a first fiber of the first material to the second material and returning to the first material and knitting a second fiber of the second material to the first material and returning to the second material, and wherein the quilt line is formed around at least one of the plurality of lay-in elements.

The knitted quilt fabric may be any knitted quilt fabric 100 disclosed herein. The outer layer may be any first layer 10 disclosed herein. The inner layer may be any second layer 20 disclosed herein.

The tubular body 50 is an elongated tube-shaped structure having an annular wall 51 formed from the knitted quilt fabric 100. The annular wall 51 defines an annular passageway 52 extending through the tubular body 50. A wearer's body part, such as a limb, may extend through, or otherwise be disposed within, the annular passageway 52. The knitted quilt fabric 100 has opposing surfaces—an outer surface and an inner surface.

Figure 4A:
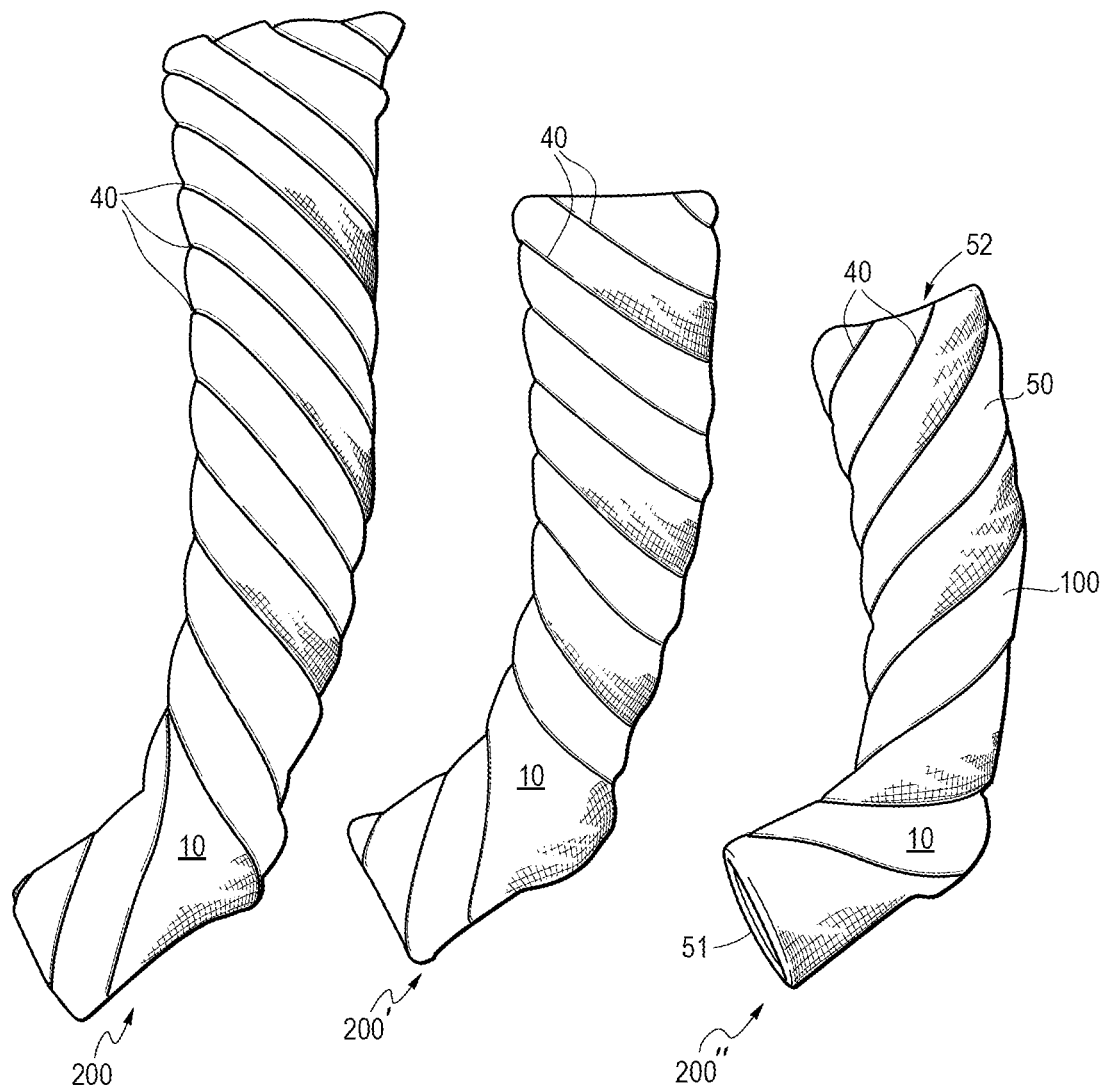
FIG. 4A illustrates exemplary lower limb compression garments, in accordance with embodiments of the present disclosure.
Figure 4B:
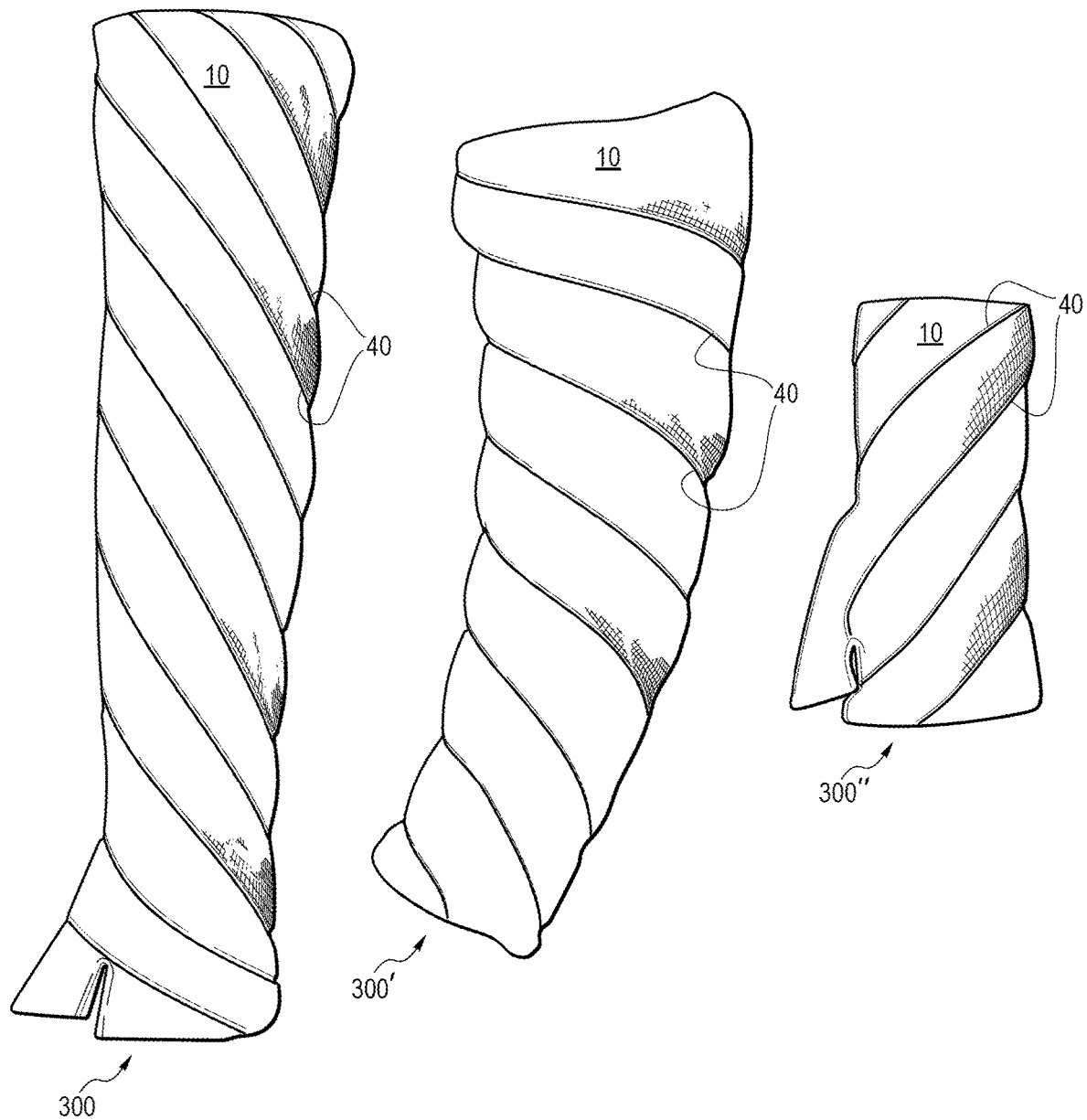
FIG. 4B illustrates exemplary upper limb compression garments, in accordance with embodiments of the present disclosure.

FIGS. 4A and 4B illustrate embodiments of exemplary compression garments 200 and 300 made using the knitted quilt fabric 100. Specifically, FIG. 4A illustrates various lower limb compression garments 200, 200' and 200" and FIG. 4B illustrates various upper limb compression garments 300, 300' and 300", and the garments vary in how much of a limb is covered. For example, compression garments 200, 200' and 200" cover from the foot to above the knee, below the knee, and calf, respectively, and compression garments 300, 300' and 300" cover from the metacarpals to above the axilla, from the wrist to the axilla, and from the metacarpals to above the wrist, respectively. It will be appreciated that a compression garment, such as for a lower limb or upper limb, may be of various lengths and cover different portions of a limb depending on the intended use and desired effect.

In further embodiments, compression garments made using the knitted quilt fabric 100 may be compression garments for at least a portion of a torso (that is, from the shoulders to hips, inclusive), neck (that is, from the shoulders to the base of the skull) and/or head (that is, from the base of the skull and inclusive of the skull), either alone or in combination with an upper or lower limb.

In an embodiment, one or both layers 10, 20 may be treated with one or more surface treatments such as an antimicrobial composition, antibacterial composition, odor eliminating composition, and so forth. In still further embodiments, additional layers may be included between or outward from the first and second layers 10, 20, including, but not limited to, moisture-wicking material layers, supportive layers, and combinations of these and other layers.

As shown in FIGS. 4A and 4B, the quilt lines 40 of the knitted quilt fabric 100 run in a spiral fashion around the garment 200, 300 rather than linearly with a central garment axis or radially about a central garment axis. The spiral seams provide compression on a limb with no tourniquet effect and prevents rolling of the edges of the compression garment when worn.

In an embodiment, the compression garment 200, 300 includes, consists essentially of, or consists of:

a tubular body 50 having an axis, wherein the tubular body 50 is made of a knitted quilt fabric 100 containing, consisting essentially of, or consisting of (i) an outer layer 10 containing, consisting essentially of, or consisting of a first knit material;

(ii) an inner layer 20 containing, consisting essentially of, or consisting of a second knit material;

(iii) a filler layer 30 containing, consisting essentially of, or consisting of a filler material, the filler layer 30 positioned between the outer layer 10 and the inner layer 20, the filler material containing, consisting essentially of, or consisting of a plurality of lay-in elements 45, the plurality of lay-in elements 45 each comprising an elastic polyether-polyurea copolymer fiber;

wherein the outer layer 10 and inner layer 20 are joined in a plurality of locations forming at least one quilt line 40, wherein the at least one quilt line 40 is formed from a plurality of seam knits 48 made by knitting a first fiber 41 of the first material to the second material and returning to the first material and knitting a second fiber 42 of the second material to the first material and returning to the second material, wherein at least one of the plurality of lay-in elements 45 is inside each of the plurality of seam knits 48; and wherein the knitted quilt fabric 100 has one, some, or all of the following properties:

(a) the first knit material and/or the second knit material is a jersey knit material and/or a rib knit material; and/or (b) the first knit material and/or the second knit material are made of a polyester, polyamide, polypropylene, polyethylene, polyether-polyurea copolymer, silk, cotton, rayon, and combinations of thereof; and/or (c) the first knit material and/or the second knit material is selected from nylon, silk, cotton, rayon, and combinations thereof; and/or (d) the filler material comprises a plurality of microfibers; and/or (e) the one or more synthetic or natural fibers is a natural fiber made of cotton, wool, bamboo, cashmere, alpaca, mohair, or other animal fur or plant-based fiber and combinations thereof; and/or (f) the plurality of lay-in elements 45 is plaited with one or more natural or synthetic fibers; and/or (g) the one or more synthetic or natural fibers yarns is a synthetic fiber yarn made of polyester, polyamide, polypropylene, polyethylene, polyether-polyurea copolymer, rayon and combinations thereof; and/or (h) the knitted quilt fabric 100 comprises at least two quilt lines 40, or at least three quilt lines 40, or at least four quilt lines 40, or at least five quilt lines 40, or at least six quilt lines 40, or at least seven quilt lines 40, or at least eight quilt lines 40; and/or (i) the quilt lines 40 are separated from each other by a distance, X, of from 1 cm to 20 cm, or from 1 cm to 10 cm, or from 1 cm to 8 cm, or from 1 cm to 5 cm, or from 2 cm to 5 cm, or from 3 cm to 5 cm, or from 4 cm to 5 cm, or from 5 cm to 20 cm, or from 1 cm to 4 cm; and/or (j) the lay-in elements 45 are at an orientation of from 50° to 150°, or from 70° to 120°, or from 80° to 110°, or from 90° to 100°, or from 50° to less than 90°, or from 70° to less than 90°, or from greater than 90° to 150°, or from greater than 90° to 120°, or 90° relative to the quilt line 40; and/or (k) each of the plurality of lay-in elements 45 is not perpendicular to the at least one quilt line 40; and/or (l) the outer layer 10 and/or the inner layer 20 is treated with one or more surface treatments, such as an antimicrobial composition, antibacterial composition, odor eliminating composition, and combinations thereof; and/or (m) the quilt lines 40 run in a spiral fashion around the compression garment 200, 300 rather than linearly with a central garment axis or radially about a central garment axis; and the compression garment 200, 300 has one, some, or all of the following properties:

(n) the compression garment 200, 300 is selected from a lower limb compression garment 200, an upper limb compression garment 300, a torso compression garment, neck compression garment, a head compression garment, and combinations thereof; and/or (o) the compression garment is a lower limb compression garment 200 configured to extend from a wearer's foot to above a wearer's knee; and/or (p) the compression garment is a lower limb compression garment 200' configured to extend from a wearer's foot to below a wearer's knee; and/or (q) the compression garment is a lower limb compression garment 200" configured to extend from a wearer's foot to a wearer's calf; and/or (r) the compression garment is an upper limb compression garment 300 configured to extend from a wearer's metacarpals to above a wearer's axilla; and/or (s) the compression garment is an upper limb compression garment 300' configured to extend from a wearer's wrist to a wearer's axilla; and/or (t) the compression garment is an upper limb compression garment 300" configured to extend from a wearer's metacarpals to above a wearer's wrist.

In an embodiment, the compression garment 200, 300 includes, consists essentially of, or consists of:

a tubular body 50 having an axis, wherein the tubular body 50 is made of a knitted quilt fabric 100 containing, consisting essentially of, or consisting of (i) an outer layer 10 containing, consisting essentially of, or consisting of a first knit material;

(ii) an inner layer 20 containing, consisting essentially of, or consisting of a second knit material;

(iii) a filler layer 30 containing, consisting essentially of, or consisting of a filler material, the filler layer 30 positioned between the outer layer 10 and the inner layer 20, the filler material containing, consisting essentially of, or consisting of a plurality of lay-in elements 45, the plurality of lay-in elements 45 each comprising an elastic polyether-polyurea copolymer fiber; wherein the outer layer 10 and inner layer 20 are joined in a plurality of locations forming at least one quilt line 40, wherein the at least one quilt line 40 includes a plurality of seam knits arranged end-to-end, and each seam knit includes a plurality of overlapping stitches that includes (a) a first stitch 46 formed from a fiber 41 of the outer layer 10 that extends (i) from the outer layer 10, (ii) through the filler layer 30 at a first position, (iii) into the inner layer 20 such that the fiber 41 is knitted to the inner layer 20, (iv) through the filler layer 30 at a second position, and (v) back into the outer layer 10; and (b) a second stitch 47 formed from a fiber 42 of the inner layer 20 that extends (i) from the inner layer 20, (ii) through the filler layer 30 at a third position, (iii) into the outer layer 10 such that the fiber 42 is knitted to the outer layer 10, (iv) through the filler layer 30 at a fourth position, and (v) back into the inner layer 20;

wherein at least one of the plurality of lay-in elements 45 is inside each of the plurality of seam knits 48; and the knitted quilt fabric 100 has one, some, or all of the following properties:

(a) the first knit material and/or the second knit material is a jersey knit material and/or a rib knit material; and/or (b) the first knit material and/or the second knit material are made of a polyester, polyamide, polypropylene, polyethylene, polyether-polyurea copolymer, silk, cotton, rayon, and combinations of thereof; and/or (c) the first knit material and/or the second knit material is selected from nylon, silk, cotton, rayon, and combinations thereof; and/or (d) the filler material comprises a plurality of microfibers; and/or (e) the plurality of lay-in elements 45 is plaited with one or more natural or synthetic fibers; and/or (f) the one or more synthetic or natural fibers is a natural fiber made of cotton, wool, bamboo, cashmere, alpaca, mohair, or other animal fur or plant-based fiber and combinations thereof; and/or (g) the one or more synthetic or natural fibers is a synthetic fiber made of polyester, polyamide, polypropylene, polyethylene, polyether-polyurea copolymer, rayon and combinations thereof; and/or (h) the knitted quilt fabric 100 comprises at least two quilt lines 40, or at least three quilt lines 40, or at least four quilt lines 40, or at least five quilt lines 40, or at least six quilt lines 40, or at least seven quilt lines 40, or at least eight quilt lines 40; and/or (i) the quilt lines 40 are separated from each other by a distance, X, of from 1 cm to 20 cm, or from 1 cm to 10 cm, or from 1 cm to 8 cm, or from 1 cm to 5 cm, or from 2 cm to 5 cm, or from 3 cm to 5 cm, or from 4 cm to 5 cm, or from 5 cm to 20 cm, or from 1 cm to 4 cm; and/or (j) the lay-in elements 45 are at an orientation of from 50° to 150°, or from 70° to 120°, or from 80° to 110°, or from 90° to 100°, or from 50° to less than 90°, or from 70° to less than 90°, or from greater than 90° to 150°, or from greater than 90° to 120°, or 90° relative to the quilt line 40; and/or (k) each of the plurality of lay-in elements 45 is not perpendicular to the at least one quilt line 40; and/or (l) the outer layer 10 and/or the inner layer 20 is treated with one or more surface treatments, such as an antimicrobial composition, antibacterial composition, odor eliminating composition, and combinations thereof; and/or (m) the first position is the same or different than the third position; and/or (n) the second position is the same or different than the fourth position; and/or (o) the quilt lines 40 run in a spiral fashion around the compression garment 200, 300 rather than linearly with a central garment axis or radially about a central garment axis; and the compression garment 200, 300 has one, some, or all of the following properties:

(p) the compression garment 200, 300 is selected from a lower limb compression garment 200, an upper limb compression garment 300, a torso compression garment, neck compression garment, a head compression garment, and combinations thereof; and/or (q) the compression garment is a lower limb compression garment 200 configured to extend from a wearer's foot to above a wearer's knee; and/or (r) the compression garment is a lower limb compression garment 200' configured to extend from a wearer's foot to below a wearer's knee; and/or (s) the compression garment is a lower limb compression garment 200" configured to extend from a wearer's foot to a wearer's calf; and/or (t) the compression garment is an upper limb compression garment 300 configured to extend from a wearer's metacarpals to above a wearer's axilla; and/or (u) the compression garment is an upper limb compression garment 300' configured to extend from a wearer's wrist to a wearer's axilla; and/or (v) the compression garment is an upper limb compression garment 300" configured to extend from a wearer's metacarpals to above a wearer's wrist.

Garments

In accordance with some embodiments of the present disclosure, a garment is provided. The garment comprises a body made of a knitted quilt fabric. The knitted quilt fabric comprises a first layer of a first knit material; a second layer of a second knit material; and a filler material between the first layer and second layer comprising a plurality of lay-in elements 45, the plurality of lay-in elements each comprising an elastic polyether-polyurea copolymer fiber; wherein the first layer and second layer are joined in a plurality of locations forming at least one quilt line, wherein the at least one quilt line is formed from a plurality of knits made by knitting a first fiber of the first material to the second material and returning to the first material and knitting a second fiber of the second material to the first material and returning to the second material, and wherein at least one of the plurality of lay-in elements fibers is inside each of the plurality of knits.

The knitted quilt fabric may be any knitted quilt fabric 100 disclosed herein. The first layer may be any first layer 10 disclosed herein. The second layer may be any second layer 20 disclosed herein.

The garment may be a compression garment or a non-compression garment. In an embodiment, the garment is a non-compression garment. Nonlimiting examples of suitable non-compression garments include jackets, coats, sweaters, sweatshirts, jumpers, pants, mittens, gloves, caps, socks, leg warmers, ponchos, scarves, wraps, vests, dresses, skirts, shorts, robes, shirts, and scarves.

In another embodiment, the garment is a compression garment. The compression garment may be any compression garment 200, 200', 200", 300, 300', 300" disclosed herein.

In an embodiment, the garment comprises a body comprising at least one layer made of the knitted quilt fabric.

In an embodiment, the garment comprises a body comprising a knitted quilt fabric 100, the knitted quilt fabric comprising, consisting essentially of, or consisting of:

(i) a first layer 10 containing, consisting essentially of, or consisting of a first knit material;

(ii) a second layer 20 containing, consisting essentially of, or consisting of a second knit material;

(iii) a filler layer 30 containing, consisting essentially of, or consisting of a filler material, the filler layer 30 positioned between the first layer 10 and the second layer 20, the filler material containing, consisting essentially of, or consisting of a plurality of lay-in elements 45, the plurality of lay-in elements 45 each comprising an elastic polyether-polyurea copolymer fiber; wherein the first layer 10 and second layer 20 are joined in a plurality of locations forming at least one quilt line 40, wherein the at least one quilt line 40 is formed from a plurality of seam knits 48 made by knitting a first fiber 41 of the first material to the second material and returning to the first material and knitting a second fiber 42 of the second material to the first material and returning to the second material, wherein at least one of the plurality of lay-in elements 45 is inside each of the plurality of seam knits 48; and wherein the knitted quilt fabric has one, some, or all of the following properties:

(a) the first knit material and/or the second knit material is a jersey knit material and/or a rib knit material; and/or (b) the first knit material and/or the second knit material are made of a polyester, polyamide, polypropylene, polyethylene, polyether-polyurea copolymer, silk, cotton, rayon, and combinations of thereof; and/or (c) the first knit material and/or the second knit material is selected from nylon, silk, cotton, rayon, and combinations thereof; and/or (d) the filler material comprises a plurality of microfibers; and/or (e) the plurality of lay-in elements 45 is plaited with one or more natural or synthetic fibers; and/or (f) the one or more synthetic or natural fibers is a natural fiber made of cotton, wool, bamboo, cashmere, alpaca, mohair, or other animal fur or plant-based fiber and combinations thereof; and/or (g) the one or more synthetic or natural fibers is a synthetic fibers made of polyester, polyamide, polypropylene, polyethylene, polyether-polyurea copolymer, rayon and combinations thereof; and/or (h) the knitted quilt fabric 100 comprises at least two quilt lines 40, or at least three quilt lines 40, or at least four quilt lines 40, or at least five quilt lines 40, or at least six quilt lines 40, or at least seven quilt lines 40, or at least eight quilt lines 40; and/or (i) the quilt lines 40 are separated from each other by a distance, X, of from 1 cm to 20 cm, or from 1 cm to 10 cm, or from 1 cm to 8 cm, or from 1 cm to 5 cm, or from 2 cm to 5 cm, or from 3 cm to 5 cm, or from 4 cm to 5 cm, or from 5 cm to 20 cm, or from 1 cm to 4 cm; and/or (j) the lay-in elements 45 are at an orientation of from 50° to 150°, or from 70° to 120°, or from 80° to 110°, or from 90° to 100°, or from 50° to less than 90°, or from 70° to less than 90°, or from greater than 90° to 150°, or from greater than 90° to 120°, or 90° relative to the quilt line 40; and/or (k) each of the plurality of lay-in elements 45 is not perpendicular to the at least one quilt line 40; and/or (l) the first layer 10 and/or the second layer 20 is treated with one or more surface treatments, such as an antimicrobial composition, antibacterial composition, odor eliminating composition, and combinations thereof; and/or (m) the knitted quilt fabric 100 is in the form of a compression garment.

In an embodiment, the garment comprises a body comprising a knitted quilt fabric 100, the knitted quilt fabric comprising, consisting essentially of, or consisting of:

(i) a first layer 10 containing, consisting essentially of, or consisting of a first knit material;

(ii) a second layer 20 containing, consisting essentially of, or consisting of a second knit material;

(iii) a filler layer 30 containing, consisting essentially of, or consisting of a filler material, the filler layer 30 positioned between the first layer 10 and the second layer 20, the filler material containing, consisting essentially of, or consisting of a plurality of lay-in elements 45, the plurality of lay-in elements 45 each comprising an elastic polyether-polyurea copolymer fiber; wherein the first layer 10 and second layer 20 are joined in a plurality of locations forming at least one quilt line 40, wherein the at least one quilt line 40 includes a plurality of seam knits arranged end-to-end, and each seam knit includes a plurality of overlapping stitches that includes (a) a first stitch 46 formed from a fiber 41 of the first layer 10 that extends
  (i) from the first layer 10,
  (ii) through the filler layer 30 at a first position,
  (iii) into the second layer 20 such that the fiber 41 is knitted to the second layer 20,
  (iv) through the filler layer 30 at a second position, and
  (v) back into the first layer 10; and (b) a second stitch 47 formed from a fiber 42 of the second layer 20 that extends (i) from the second layer 20, (ii) through the filler layer 30 at a third position, (iii) into the first layer 10 such that the fiber 42 is knitted to the first layer 10, (iv) through the filler layer 30 at a fourth position, and (v) back into the second layer 20;

wherein at least one of the plurality of lay-in elements 45 is inside each of the plurality of seam knits 48; and the knitted quilt fabric has one, some, or all of the following properties:

(a) the first knit material and/or the second knit material is a jersey knit material and/or a rib knit material; and/or (b) the first knit material and/or the second knit material are made of a polyester, polyamide, polypropylene, polyethylene, polyether-polyurea copolymer, silk, cotton, rayon, and combinations of thereof; and/or (c) the first knit material and/or the second knit material is selected from nylon, silk, cotton, rayon, and combinations thereof; and/or (d) the filler material comprises a plurality of microfibers; and/or (e) the one or more synthetic or natural fibers is a natural fiber made of cotton, wool, bamboo, cashmere, alpaca, mohair, or other animal fur or plant-based fiber and combinations thereof; and/or (f) the plurality of lay-in elements 45 is plaited with one or more natural or synthetic fibers; and/or (g) the one or more synthetic or natural fibers is a synthetic fiber made of polyester, polyamide, polypropylene, polyethylene, polyether-polyurea copolymer, rayon and combinations thereof; and/or (h) the knitted quilt fabric 100 comprises at least two quilt lines 40, or at least three quilt lines 40, or at least four quilt lines 40, or at least five quilt lines 40, or at least six quilt lines 40, or at least seven quilt lines 40, or at least eight quilt lines 40; and/or (i) the quilt lines 40 are separated from each other by a distance, X, of from 1 cm to 20 cm, or from 1 cm to 10 cm, or from 1 cm to 8 cm, or from 1 cm to 5 cm, or from 2 cm to 5 cm, or from 3 cm to 5 cm, or from 4 cm to 5 cm, or from 5 cm to 20 cm, or from 1 cm to 4 cm; and/or (j) the lay-in elements 45 are at an orientation of from 50° to 150°, or from 70° to 120°, or from 80° to 110°, or from 90° to 100°, or from 50° to less than 90°, or from 70° to less than 90°, or from greater than 90° to 150°, or from greater than 90° to 120°, or 90° relative to the quilt line 40; and/or
(k) each of the plurality of lay-in elements 45 is not perpendicular to the at least one quilt line 40; and/or
(l) the first layer 10 and/or the second layer 20 is treated with one or more surface treatments, such as an antimicrobial composition, antibacterial composition, odor eliminating composition, and combinations thereof; and/or
(m) the first position is the same or different than the third position; and/or
(n) the second position is the same or different than the fourth position; and/or
(o) the knitted quilt fabric 100 is in the form of a compression garment.

The foregoing description has been presented for purposes of illustration and description. It is not intended to be exhaustive or to limit the disclosure to the precise form disclosed or to the materials in which the form may be embodied, and many modifications and variations are possible in light of the above teaching.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A knitted quilt fabric comprising:
a first layer of a first knit material;
a second layer of a second knit material; and
a filler material between the first layer and the second layer, the filler material comprising
a plurality of lay-in elements, each lay-in element including an elastic yarn, and
one or more natural or synthetic fibers;
wherein the first layer and the second layer are joined in a plurality of locations forming a first quilt line,
wherein the first quilt line is formed from a plurality of seam knits arranged linearly with one another,
wherein each seam knit includes
a first stitch formed from a first fiber of the first layer that extends from the first layer, through the filler material, into the second layer such that the first fiber is knitted to the second layer, back through the filler material, and back into the first layer, and
a second stitch formed from a second fiber of the second layer that extends from the second layer, through the filler material, into the first layer such that the second fiber is knitted to the first layer, back through the filler material, and back into the second layer,
wherein a first one of the plurality of lay-in elements runs through each first stitch and each second stitch of the first quilt line.

2. The knitted quilt fabric of claim 1, wherein the first knit material and the second knit material are a jersey knit material.

3. The knitted quilt fabric of claim 1, wherein the first knit material and the second knit material are made of polyester, polyamide, polypropylene, polyethylene, polyether-polyurea copolymer, silk, cotton, rayon, and combinations thereof.

4. The knitted quilt fabric of claim 1, wherein the first knit material and the second knit material are made of nylon, silk, cotton, rayon and combinations thereof.

5. The knitted quilt fabric of claim 1, wherein the filler material comprises a plurality of microfibers.

6. The knitted quilt fabric of claim 5, wherein the one or more synthetic fibers comprises a synthetic microfiber formed of a material including one or more of polyester, polyamide, and polypropylene.

7. The knitted quilt fabric of claim 1, further comprising a second quilt line.

8. The knitted quilt fabric of claim 7, wherein a distance between the first quilt line and the second quilt line is in a range from 1 cm to 20 cm apart.

9. The knitted quilt fabric of claim 1, wherein each of the plurality of lay-in elements run from 50° to 150° relative to the first quilt line.

10. The knitted quilt fabric of claim 1, wherein each of the plurality of lay-in elements is not perpendicular to the first quilt line.

11. The knitted quilt fabric of claim 1, wherein the knitted quilt fabric is configured to be in the form of a compression garment.

12. A knitted quilt fabric comprising:
a first knit layer formed of a first knit material;
a second knit layer formed of a second knit material, the second knit layer being joined to the first knit layer at a plurality of locations forming a quilt line,
the quilt line being formed of a plurality of seam knits arranged linearly with one another, each seam knit including
a first stitch formed by knitting a first fiber of the first knit layer into the second knit layer, and
a second stitch formed by knitting a second fiber of the second knit layer into the first knit layer; and
a plurality of lay-in elements between the first knit layer and the second knit layer, wherein a first one of the plurality of lay-in elements runs through each first stitch and each second stitch of the quilt line.

13. The knitted quilt fabric of claim 12, wherein one or more of the first knit layer and the second knit layer are a jersey knit material.

14. The knitted quilt fabric of claim 12, wherein the first knit material and/or the second knit material are made of polyester, polyamide, polypropylene, polyethylene, polyether-polyurea copolymer, silk, cotton, rayon and combinations of thereof.

15. The knitted quilt fabric of claim 12, wherein one or more of the plurality of lay-in elements include a core and an additional fiber twisted around the core.

16. The knitted quilt fabric of claim 15, wherein the core is elastic.

17. The knitted quilt fabric of claim 15, wherein the additional fiber is one or more of a microfiber, a polymer fiber, and a natural fiber.

18. The knitted quilt fabric of claim 12, wherein
the plurality of locations is a first plurality of locations,
the quilt line is a first quilt line,
the plurality of seam knits is a first plurality of seam knits,
the second knit layer is joined to the first knit layer at a second plurality of locations forming a second quilt line,
the second quilt line is formed of a second plurality of seam knits arranged linearly with one another, and
each seam knit of the second plurality of seam knits includes
a first stitch formed by knitting the first fiber of the first knit layer into the second knit layer, and
a second stitch formed by knitting the second fiber of the second knit layer into the first knit layer.

19. The knitted quilt fabric of claim 18, wherein a distance between the first quilt line and the second quilt line is in a range from 1 cm to 20 cm.

20. The knitted quilt fabric of claim 12, wherein each lay-in element of the plurality of lay-in elements is non-parallel with the quilt line.

* * * * *